May 8, 1934.  M. A. MILLING  1,958,063
BELL AND SPIGOT PIPE CONNECTION
Filed March 2, 1933  2 Sheets-Sheet 1
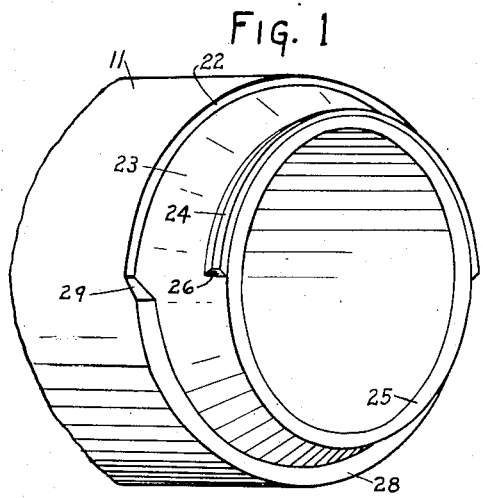
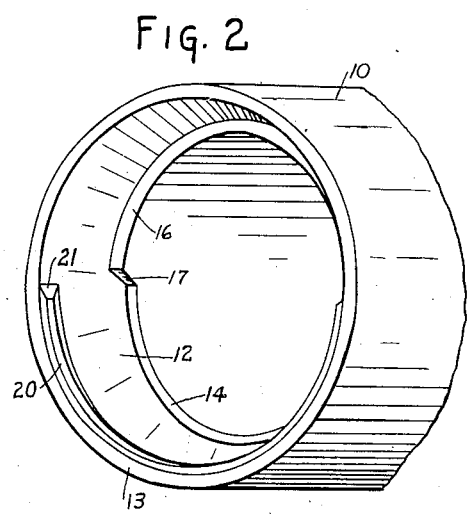
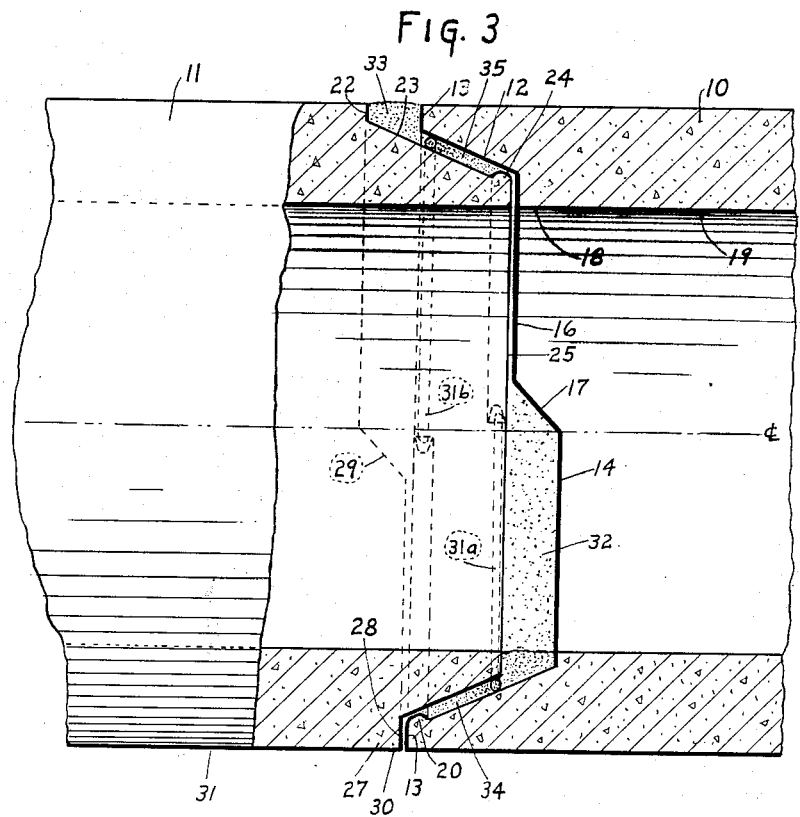
INVENTOR.
MARTIN A. MILLING
BY
ATTORNEYS.

May 8, 1934.  M. A. MILLING  1,958,063
BELL AND SPIGOT PIPE CONNECTION
Filed March 2, 1933   2 Sheets-Sheet 2
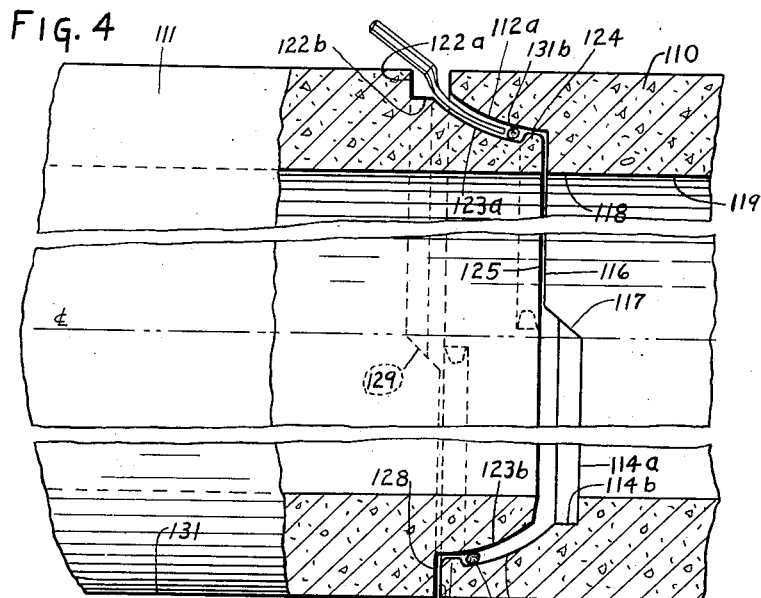
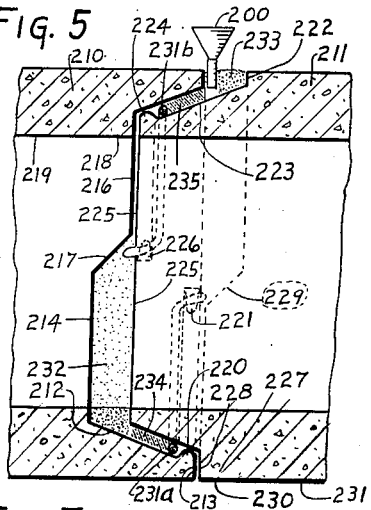
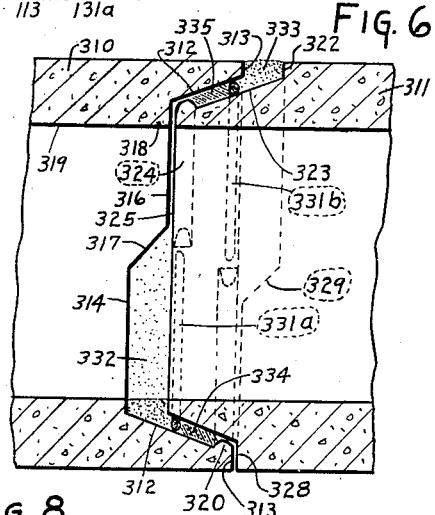
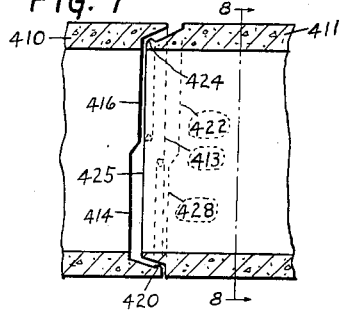
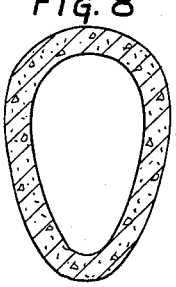
INVENTOR.
MARTIN A. MILLING
BY
ATTORNEYS.

Patented May 8, 1934

1,958,063

UNITED STATES PATENT OFFICE 1,958,063

BELL AND SPIGOT PIPE CONNECTION

Martin A. Milling, Indianapolis, Ind.

Application March 2, 1933, Serial No. 659,291

9 Claims. (Cl. 285—111)

This invention relates to a pipe joint.

The chief object of this invention is to provide a water tight joint between cooperating ends of pipe sections, which is particularly applicable to large size concrete pipe, that is, those approximating 18″ and larger in diameter, if of circular form, or of that width or depth if of non-circular form, which joint is characterized by the fact that there is provided annular channel means between the cooperating telescopic portions of the bell and spigot ends, which annular channel means can be filled with jointing material, or materials, by plastering or troweling or by a pouring operation, or can be filled by a multiple application operation.

Another object of the invention is to provide an annular channel between the cooperating telescopic portions of the bell and spigot ends, which annular channel is accessible substantially throughout its entire length for corking and filling with jointing material, or materials.

Another object of the invention is to provide a bell and spigot connection, the cooperating portions of the bell and spigot being so arranged that the pipe may be joined so that the lower exposed portion of the joint is within the pipe and the upper portion of the joint is without the pipe, thereby insuring that the material for the joint will be sustained by the pipe.

One feature of the invention consists in the formation of the cooperating portions of the bell and spigot such that in addition to the accomplishment of the foregoing objects, there is, in the case of a circular pipe, a substantially butt joint connection for approximately one-half of the bell and spigot contact and internally positioned and there is a butt joint connection for approximately one-half of the bell and spigot connection and externally positioned, the two being offset so as to form a substantially circular butt joint contact offset the linear distance between the two semi-circular butt joint contacts.

The invention which is peculiarly adaptable to pipes having a circular cross-section, may also be applied to pipes having a non-circular cross-section.

Another feature of the invention consists in the formation of the inclined surfaces of the cooperating bell and spigot portions such that in certain instances these are not truly conical but have curved elements rather than linear elements.

The full nature of the invention will be understood from the accompanying drawings and the following description and claims:—

In the drawings, Fig. 1 is a perspective view of the spigot end of a pipe member of substantially circular cross-section.

Fig. 2 is a similar view of the bell end of such a pipe member, it being understood that each pipe member has at opposite ends these complementary formations.

Fig. 3 is an enlarged elevational view, parts being broken away and being shown in central section to illustrate the cooperative relation between the two complementary ends and with the joint forming material included therebetween, the two portions of the joint forming material being separated by the jute and being of like character.

Fig. 4 is a view similar to Fig. 3, except that the telescopic portions of the bell and spigot are shown curved and the joint is not filled, and a calking iron is shown in operative position preliminary to completing the joint, and in this figure the jute is positioned substantially at the ends of the joint instead of intermediate the joint, as shown in Fig. 3.

Fig. 5 is a longitudinal sectional view on a smaller scale and illustrates the form of the invention shown in Figs. 1 to 3 inclusive, arranged for a so-called poured joint connection.

Fig. 6 is a similar view of a joint and corresponds to that shown in Fig. 3, except that one portion of the joint is of a plastic composition and the other is a cement composition.

Fig. 7 is a still smaller sectional view similar to Figs. 5 and 6 and of a non-circular section type of pipe.

Fig. 8 is a transverse sectional view of one of the pipe sections shown in Fig. 7 and is taken on line 8—8 of Fig. 7, and in the direction of the arrows.

In Figs. 1 to 3 of the drawings, there is illustrated a pair of pipe sections of the general character known as a concrete pipe suitable for water and sewage systems, and each pipe section has complementary ends, one of the bell type and the other of the spigot type. 10 indicates one section which herein is shown of circular outline and includes the bell end of the pipe. 11 indicates another section and the same is provided with a spigot end of the pipe, the two being telescopically associated as shown in Fig. 3.

The bell end of the pipe includes an inwardly tapered portion 12 provided with a peripheral forward edge 13 and a rearward face 14. An inwardly directed shoulder 16 includes two diametrically positioned inclined ends 17 and the inner surface portion 18 thereof is a continuation of the inner surface 19 of the section 10. The other half of the bell formation is provided at the forward edge 13 and linearly and arcuately offset from the before mentioned projection is the inwardly extending projection 20 which is in the form of a ridge and the same may be arcuate in cross-section and has tapered ends 21. As shown clearly in Figs. 2 and 3, each of the inwardly projecting portions 16 and 20 are substantially semi-circular in length.

The spigot end of the pipe includes a peripheral shoulder 22 and an inwardly directed inclined portion 23 and two outwardly directed projecting portions. One outwardly directed projecting portion constitutes the ridge 24 substantially similar to the ridge 20 and may be arcuate in linear section and is positioned at the end of the spigot portion and the pipe includes the forward end or face 25, said ridge at its opposite ends terminating in the tapered portions 26.

Projecting outwardly from the portion 23 is the portion 27 having the face 28 and the two inclined ends 29 and an exterior surface 30 that corresponds to or is an extension of the exterior surface 31 of the pipe. Herein the two outwardly directed portions 24 and 27 are each substantially semi-circular in length and as will be apparent from Fig. 3, the ridge 20 having the face 13 is adapted to bear against the face 28 of the ridge 27 and the face 25 of the ridge 24 is adapted to bear against the face 16 of the portion 18. This provides two substantially semi-circular offset substantially semi-circular abutting contacts that are linearly offset the width of a groove defined by the linear distance between the two ridges 20 and 24 when the two pipe sections are positioned in butt joint relation. This groove is of peripheral character and lies between the inner inclined wall 12 of the bell portion and the outer inclined wall 23 of the spigot portion.

Preferably the sections are positioned as shown in Fig. 3. When thus positioned, the joint material which in Fig. 3 is shown as cement mortar of a rather stiff character, is applied internally to the lower portion of the bell, said material being retained thereon by the ridge portions 20. The two sections may then be telescopically associated. Cement mortar is then pushed into the upper portion of the annular channel from the exterior of the pipe and if needed additional cement mortar can be forced in the lower portion of the annular channel from the interior of the pipe. The jute members 31a and 31b may then be applied, one from the exterior and at the top and the other from the interior and at the bottom and then pressed downwardly or linearly towards each other, thereby compressing the joint forming material between the cooperating surfaces of the bell and spigot forming portions of the adjacent pipe ends. Thereafter the joint forming material, such as cement mortar, may be applied at the openings indicated by the numerals 32 and 33, to seal the remainder of the openings. The material included in the channel is indicated by the numerals 34 and 35 and as before stated, this material is continuous around the spigot end of the pipe.

The aforesaid construction constitutes a complete seal between the bell and spigot portions of pipe sections. Should there be any settling of the pipe, the breakage of the joint will take place in the portion 32 or 33 or both, and without materially distributing the portions 34 and 35 which will be retained in sealing relation.

In Fig. 4 there is illustrated a modified form of the invention, and in this form of the invention similar numerals of the one-hundred series are employed. In this form of the invention instead of the inwardly inclined conical surfaces, the respective inwardly inclined surfaces, in radial sections, are arcuate and the portion 123a at the top of the pipe is concave, while at the bottom of the pipe the portion 123b is convex. Similarly, the inclined surface 112a is convex at the upper portion of the pipe and the bottom portion 112b is concave. The portions 123a and 123b and the portions 112a and 112b merge at the center line of the pipe.

There is also provided the arcuate grooves 122b adjacent the faces 122a and the arcuate groove 114b adjacent the face 114a. This form of the invention permits the use of a curved calking tool or iron and permits the use of bell and spigot joints that have less exposed surfaces of jointing material than those shown in Figs. 1 to 3 inclusive.

In this form of the invention the jute 131a and 131b are illustrated as being initially applied before any of the joint forming material is applied thereto. It will be clearly seen from Fig. 4 that when this jute is calked that it will fill whatever space there might be left between the ridge 124 and the portion 112a or the ridge 120 and the portion 123b. It will be obvious also that after this jute is applied and calked that the substantially semi-circular opening between the shoulder 114a and the face 125 can be filled from the interior of the pipe with cement mortar and in like manner the opening between the shoulder 122a and the face 113 can be filled with cement mortar from the exterior of the pipe. There will now remain unfilled an inclosed channel around the circumference of the spigot between the portions 112 and 123. A small opening is left unfilled at the top portion of the joint on the exterior of the pipe and through this opening a melted metal or heated sealing compound can be poured, thus filling the said channel around the circumference of the spigot.

In Fig. 5 the jointing material is shown in position. The method of applying this jointing material is the same as described for Fig. 4. The numeral 200 indicates a conventional funnel used in pouring the melted jointing material as shown in position at 235 and 234 respectively. The jute member 231b and 231a are shown in position bearing against the smaller ridge portions 224 and 220 with their ends calked around the tapering ends 226 and 221 of the said ridges. The cement mortar shown in position at 233 and 232 completes the enclosure of the channel and thereby providing an enclosed channel around the circumference of the spigot for receiving the poured jointing material.

In Fig. 6 numerals of the three-hundred series are employed. The jointing material is shown in position. The method of placing this jointing material is substantially the same as described for Fig. 3, the only difference being that a rather stiff plastic material, indicated by the numerals 335 and 334, is used instead of the cement mortar for this position.

Figs. 7 and 8 illustrate a pair of cooperating pipe sections which in transverse section are egg shaped. The same are associated together as shown in Fig. 7 and similar parts bear numerals of the four-hundred series.

As previously stated the chief object of the invention is the formation of an annular channel between the telescopic portions of the bell and spigot of two abutting pipe sections, which channel is accessible its entire length to calking and filling with jointing materials. The ridges 20 and 24 which are aids in the formation of said annular channel or channels are preferably located as shown on accompanying drawing but if desired the position may be otherwise positioned, as for example, on either bell or spigot.

The invention claimed is:—

1. A water tight joint for pipes and the like formed by the combination of two abutting telescopically associated pipe sections each having complementary bell and spigot ends, the abutting contact arrangement comprising a plurality of successive peripherally arranged contacts of almost complete peripheral character, successive contacts being offset linearly of the pipe, and means forming an enclosed enveloping groove between the contacts comprising peripherally and linearly offset outwardly directed partially peripheral portions upon the spigot section and complementarily positioned peripherally and linearly offset inwardly directed partially peripheral portions upon the bell section.

2. A water tight joint for pipes and the like formed by the combination of two abutting telescopically associated pipe sections each having complementary bell and spigot ends, the abutting contact arrangement comprising a plurality of successive peripherally arranged contacts of almost complete peripheral character, successive contacts being offset linearly of the pipe, means forming an enclosed envelope groove between the contacts comprising peripherally and linearly offset outwardly directed partially peripheral portions upon the spigot section and complementarily positioned peripherally and linearly offset inwardly directed partially peripheral portions upon the bell section, and an inwardly directed portion abuttably engaging an outwardly directed portion of an adjacent section at the abutting contact.

3. A water tight joint for pipes and the like formed by the combination of two abutting telescopically associated pipe sections each having complementary bell and spigot ends, the abutting contact arrangement comprising a plurality of successive peripherally arranged contacts of almost complete peripheral character, successive contacts being offset linearly of the pipe, means forming an enclosed enveloping groove between the contacts comprising peripherally and linearly offset outwardly directed partially peripheral portions upon the spigot section and complementarily positioned peripherally and linearly offset inwardly directed partially peripheral portions upon the bell section, and an inwardly directed portion abuttably engaging an outwardly directed portion of an adjacent section at the abutting contact, and positioned to form a curved interior entrance to the lower portion of the groove and a curved exterior entrance to the upper portion of the groove.

4. A water tight joint for pipes and the like formed by the combination of two abutting telescopically associated pipe sections each having complementary bell and spigot ends, the abutting contact arrangement comprising a plurality of successive peripherally arranged contacts of almost complete peripheral character successive contacts being offset linearly of the pipe, and means forming an enclosed enveloping groove between the contacts comprising peripherally and linearly offset outwardly directed partially peripheral portions upon the spigot section and complementarily positioned peripherally and linearly offset inwardly directed partially peripheral portions upon the bell section, the groove forming surfaces in longitudinal section being inclined inwardly, and each section groove forming portion including a convex and a concave curvature in longitudinal section at spaced portions curvatures of adjacent surfaces of adjacent sections being complementary.

5. A water tight joint for pipes and the like formed by the combination of two abutting telescopically associated pipe sections each having complementary bell and spigot ends, the abutting contact arrangement comprising a plurality of successive peripherally arranged contacts of almost complete peripheral character, successive contacts being offset linearly of the pipe, and means forming an enclosed enveloping groove between the contacts comprising peripherally and linearly offset outwardly directed partially peripheral portions upon the spigot section and complementarily positioned peripherally and linearly offset inwardly directed partially peripheral portions upon the bell section, the outwardly directed portions in summation substantially enveloping the joint and the inwardly directed portions in summation substantially enveloping the joint, each inwardly directed portion cooperating with an outwardly directed portion to form a substantially complete peripheral cooperative portion for groove formation and positioned upon both the interior and exterior of the pipe.

6. A water tight joint for pipes and the like formed by the combination of two abutting telescopically associated pipe sections each having complementary bell and spigot ends, the abutting contact arrangement comprising a plurality of successive peripherally arranged contacts of almost complete peripheral character, successive contacts being offset linearly of the pipe, and means forming an enclosed enveloping groove between the contacts comprising peripherally and linearly offset outwardly directed partially peripheral portions upon the spigot section and complementarily positioned peripherally and linearly offset inwardly directed partially peripheral portions upon the bell section, the outwardly directed portions in summation substantially enveloping the joint and the inwardly directed portions in summation substantially enveloping the joint, each inwardly directed portion cooperating with an outwardly directed portion to form a substantially complete peripheral cooperative portion for groove formation, said last mentioned cooperating portions being positioned upon the bell end of the pipe section.

7. A water tight joint for pipes and the like formed by the combination of two abutting telescopically associated pipe sections each having complementary bell and spigot ends, the abutting contact arrangement comprising a plurality of successive peripherally arranged contacts of almost complete peripheral character, successive contacts being offset linearly of the pipe, and means forming an enclosed enveloping groove between the contacts comprising peripherally and linearly offset outwardly directed partially peripheral portions upon the spigot section and complementarily positioned peripherally and linearly offset inwardly directed partially peripheral portions upon the bell section, the outwardly directed portions in summation substantially enveloping the joint and the inwardly directed portions in summation substantially enveloping the joint, each inwardly directed portion cooperating with an outwardly directed portion to form a substantially complete peripheral cooperative portion for groove formation said last mentioned cooperating portions being positioned upon the spigot end of the pipe section.

8. A water tight joint for pipes and the like formed by the combination of two telescopically associated complementary bell and spigot ends of adjacent pipe sections, and a plurality of means carried by the bell and spigot ends, positionable therebetween and cooperating with each other for forming a substantially complete pipe opening enveloping groove, at the telescoped portions, said sections having substantially butt joint connection comprising longitudinally spaced abutting contacts with the groove therebetween.

9. A water tight joint for pipes and the like formed by the combination of two telescopically associated complementary bell and spigot ends of adjacent pipe sections, said sections having a plurality of peripherally spaced linearly offset substantially abutting contacts adjacent portions of the bell and spigot ends linearly offset from the abutting contact providing an entrance to the peripheral space between said ends, one of said entrances being exteriorly of the pipe and another being interiorly thereof, means carried by at least one of said ends for spacing the telescopic portions of said ends apart to provide an appreciable space therebetween, and joint forming material in said space.

MARTIN A. MILLING.